Patented Nov. 24, 1942

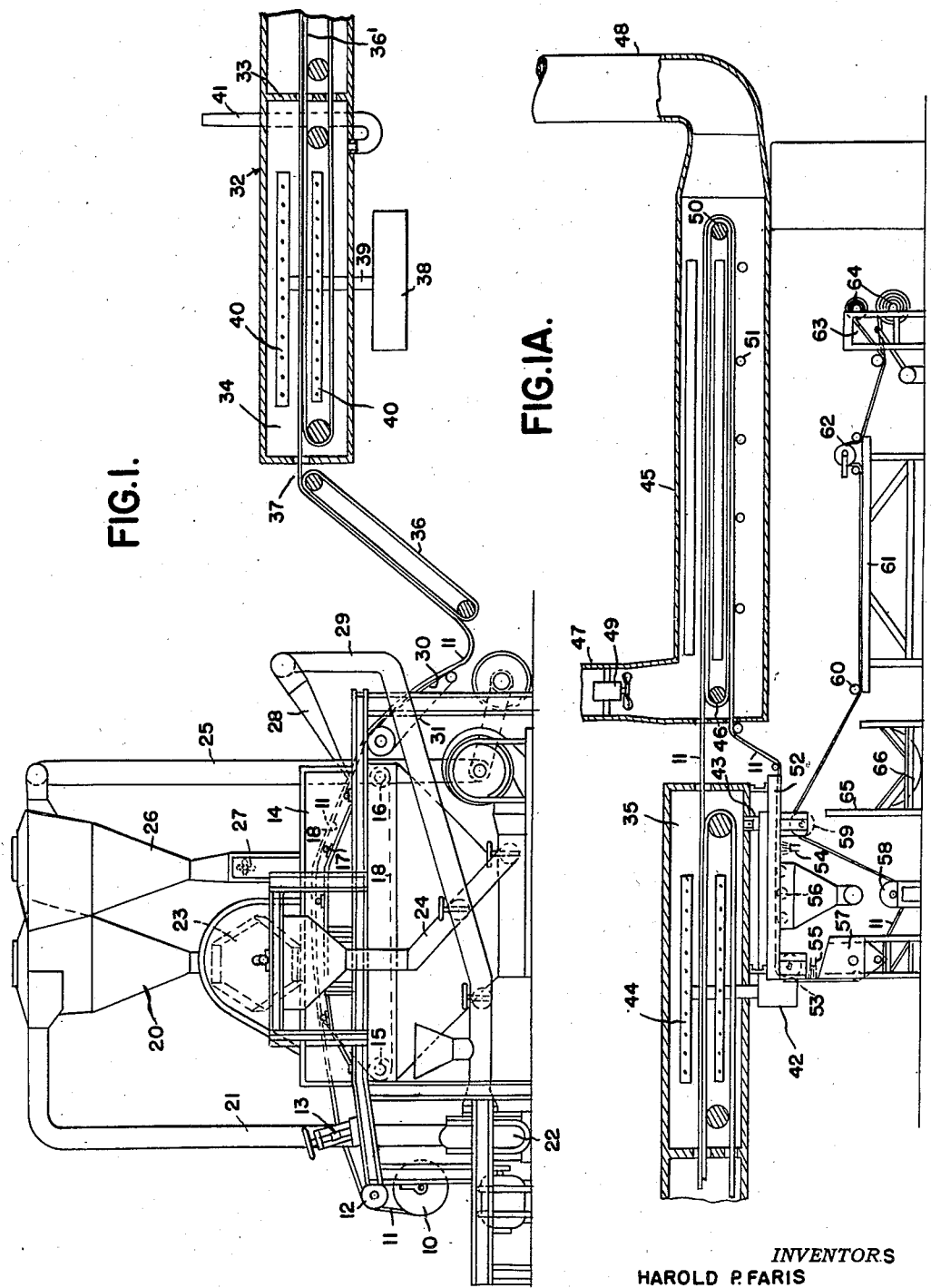

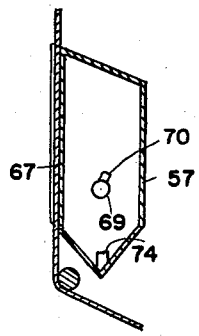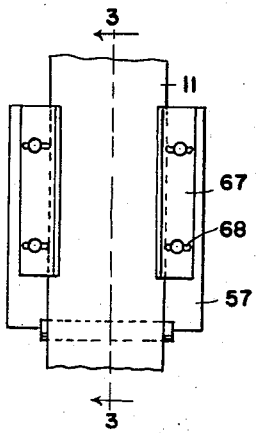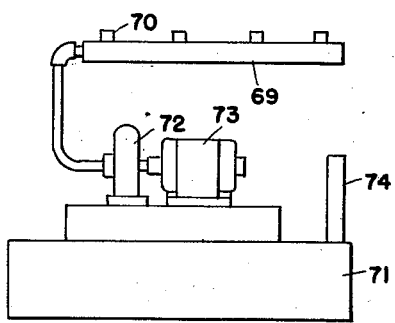

2,303,202

UNITED STATES PATENT OFFICE 2,303,202

CARPET MANUFACTURE

Harold P. Faris, Philadelphia, Pa., and Daniel W. Yochum and Russell B. Logan, Trenton, N. J., assignors to National Automotive Fibres, Inc., Detroit, Mich., a corporation of Delaware Application September 27, 1939, Serial No. 296,864

10 Claims. (Cl. 117—33)

The present invention relates to carpet manufacture and more particularly to a novel method of making cemented pile fabric in which the pile is applied in the form of cut flock.

The present application is a continuation in part of our copending application, Serial No. 260,664, entitled "Carpet," filed March 8, 1939.

Briefly described, the present invention relates to a carpet having a reinforcing upper ply of a coarse open-work fabric, such for example as burlap, a lowermost ply of relatively thick yielding padding and a surfacing ply of cemented pile.

We have found that a material having new and useful properties is produced when the herein described method is practiced.

Essentially the method comprises the steps of calendering an unvulcanized blowing rubber stock, or other similar material as will later be pointed out, to a coarse open-work fabric such for example as burlap. By this step the rubber stock is forced into the openings in the fabric with the result that the upper surface of the assembly comprises in part the threads of the fabric and in part the blowing rubber stock. As the next step in the operation, a suitable cement, preferably one containing a suitable amount of rubber, is applied to the upper surface of the assembly. Following this, the assembly is vibrated rapidly in a direction substantially perpendicular to its plane, while at the same time cut flock is sifted downwardly onto the cement coated surface. As a result of the vibration, the cut flock is embedded in the cement. Since the cement at this time is relatively soft and is also quite thin, a considerable amount of the flock penetrates completely through the coating of cement and is embedded in the upwardly exposed surface of the blowing rubber stock.

In order to vibrate the assembly without damage to the soft and easily injured unvulcanized blowing rubber stock or the like, we prefer to provide a temporary lower reinforcing fabric at the under side of the blowing rubber stock and to cause the vibration by contacting this reinforcing fabric with a rotating polygonal bar. This may conveniently be performed by advancing the carpet assembly over the upper reach of a continuous fabric conveyor, which in turn rests upon a plurality of rotating polygonal bars.

Preferably the flock is applied at two separate steps so as to insure complete coverage. After all of the flock that can be embedded in the cement surface has been applied, the upper surface of the assembly is subjected to suction to remove such flock as is in free condition or not adequately secured.

The next step in the operation is to heat the assembly in a manner to swell the blowing rubber stock, where such is used, and to vulcanize the same. Preferably the heating of the material takes place in two stages, and we find it convenient to provide two heating chambers through which the material is advanced in a continuous process. The application of heat is preferably in the form of a current of hot air, and this heating treatment, of course, causes the cement to set in a manner to firmly retain the pile therein.

During this much of the operation the material is easily injured, the blowing rubber stock or like material is soft and easily marked. Furthermore, any marks made in the stock in its unvulcanized condition are ordinarily aggravated during the subsequent blowing and vulcanizing operation. Furthermore, the cement, until it has been completely set, is soft, and the flock is not firmly retained therein. For this purpose we prefer to manufacture the product in a continuous method in which the material is assembled and treated during a continuous advance in the same direction. By this method we avoid bringing the cemented flock into contact with any mechanical device until such time as the cement is firmly set.

In order to expedite the setting of the cement and cooling of the vulcanized rubber to its ultimate final state, we also prefer to provide means for rapidly cooling the completed assembly. Conveniently, cooling means may take the form of a cooling chamber aligned with the two heating chambers previously referred to and through which the fabric advances continuously. After substantial cooling in the cooling chamber, the fabric is strong and not easily damaged. It may therefore, if desired, be passed around a roller in the cooling chamber and thence directed over a plurality of supporting rollers to the entrance side of the cooling chamber. Following this, the final treatments may be applied, which preferably take the form of applying steam, brushing, and oil treating the pile side of the fabric.

With the method thus previously described in mind, it is an object of the present invention to provide a method for manufacturing a cemented pile fabric having an integral bottom ply of yielding material, such as vulcanized sponge rubber in which a supporting fabric is temporarily attached to and movable with the under side of the blowing rubber stock during vibration of the assembly.

It is a further object of the present invention to provide a method for making a cemented pile fabric having an integral lower sponge rubber base vulcanized thereto, characterized in the initial step of calendering the blowing rubber stock to a coarse fabric, followed by the application of a cement to the other side of the fabric.

It is a further object of the present invention to provide a continuous method for making a cemented pile fabric characterized by the continuous straightforward advance of the assembly during the various treating operations without contacting the upper surface thereof with any mechanical agencies.

It is a further object of the present invention to provide a continuous method of manufacturing cemented pile fabric characterized by the steps of first heating the assembly to set the cement to blow and vulcanize the rubber stock, and then immediately cooling the assembly to condition the same for subsequent handling.

Other objects of the invention will be apparent as the description proceeds, and when taken in conjunction with the accompanying drawings wherein:

Figures 1 and 1A represent side elevations partly in section of the complete apparatus for manufacturing our cemented pile fabric;

Figure 2 is a front elevation of the oil treating device;

Figure 3 is a section on the line 3—3, Figure 2; and

Figure 4 is a schematic view illustrating the oil atomizing apparatus.

In Figures 1 and 1A we have illustrated the complete apparatus for manufacturing the cemented pile fabric. It will be understood, of course, that the illustration of this apparatus is illustrative only and that the complete method and the various steps thereof may be practiced by entirely different apparatus.

We have illustrated at 10 a roll of material 11 comprising a coarse open-work fabric, such for example as burlap, having calendered to one side thereof a relatively thick ply of unvulcanized blowing rubber stock or the like. The material 11 is arranged so that in the subsequent operation the burlap side is uppermost.

Suitable drive means (not shown) are provided for advancing the material 11 through the complete apparatus. The material 11 is advanced first around a guide roll 12 and then beneath a doctor blade 13. The doctor blade 13 is for the purpose of applying a thin uniform coating of a suitable cement, such for example as one composed essentially of rubber and resin. Instead of applying this cement by a doctor blade, it may, of course, be applied by means of a suitable roll.

The apparatus comprises a frame 14 in which are provided rolls 15 and 16 and a plurality of rotating polygonal bars 17. A protective conveyor, which may conveniently be formed of canvas or the like, is indicated at 18 and passes around the rolls 15 and 16 and over the beating elements 17.

As previously stated, the material 11 has its fabric or burlap side uppermost, and, therefore, as will be understood, has at its under side a relatively thick ply of blowing rubber stock. In order to vibrate this assembly without damage to the rubber stock, the protective conveyor 18 is advanced at the same rate as the material 11. In fact while the assembly is passing over the rotating beaters 17, the upper reach or portion of the conveyor 18 may be considered as an integral part of the assembly. We have found that by this method we avoid damage to the delicate under surface of the rubber stock.

A feed collector 20 is provided connected to a conduit 21 having attached thereto a blower 22. The conduit 21 connects with a source of pretreated flock and is adapted to feed the same downwardly into a rotating screen or sieve indicated at 23. As indicated in this figure, the rotating sieve or screen 23 is inclined so that the cut flock therein will be gradually fed toward the lower end thereof. Such of the flock as does not pass through the openings in the screen 23 pass out the end thereof and drop downwardly through a conduit 24. After passage through a conduit 25 and a second feed collector 26 provided with rotating beaters indicated at 27, such of the flock as is not firmly attached to the cement by this method is removed by a suction nozzle 28 and returned to a conduit 29 for re-use in the machine.

In order to insure the advance of the assembly through the machine, we prefer to provide a short friction conveyor indicated at 30, having conveyor belt 31 which is sanded or is otherwise provided with a friction surface. If preferred, advance may be in the same plane without bending the material. It will be noted that the material 11 advances continuously through the machine without being contacted at its upper or pile surface by any mechanical agent.

As the material advances from the conveyor 30 it is in completely assembled condition, and the further treatments necessary to complete the article is drying of the cement, and blowing and vulcanization of the rubber.

For this purpose we provide a heating chamber 32 divided by a partition 33 into two stages indicated at 34 and 35. A feed conveyor 36 is provided to receive the carpet material 11 after discharge from the conveyor 30 and to feed the same through an aperture 37 into the first stage of the heating chamber 32. A conveyor 36' therein, preferably porous, advances the material therethrough.

We have found that in order to obtain the best blowing and cure of the rubber, it is desirable to employ currents of hot air to heat the same, and for this purpose we provide a heating unit indicated at 38, which may conveniently take the form of a combined steam heater and blower having discharge conduit 39 communicating with a pair of apertured manifolds 40. In this first stage 34 the cement is dried and the vaporization of the solvents present therein render it desirable to provide a discharge conduit 41 from the stage 34 opening to atmosphere.

The second stage 35 of the heating unit 32 is in most respects similar to the first stage 34. In this case also a heating unit 42 is provided, which may conveniently take the form of a combined steam heater and blower. It is preferable, however, in the stage 35 to provide a closed circulation of air, and we have provided for this purpose a return conduit 43 for returning air to the heater 42. The air is forced into the chamber 35 by means of manifolds 44.

It is essential of course that the speed of the conveyor and the temperatures prevailing within the chambers 34 and 35 be definitely correlated and be accurately maintained. For this purpose we prefer to provide automatic controls for the heating units 38 and 42 so as to maintain the temperatures within these chambers within narrow limits.

It should be noted at this time that the carpet assembly 11, up until this point, has been advanced substantially in a straight line, and at least in the same direction, without having the pile surface thereof contacted by any mechanical agencies. The material as it leaves the chamber 35 is in its substantially complete form, and the rubber has expanded and vulcanized, while the cement has substantially set. Before the material can be further handled, however, it is necessary that the same be substantially cooled. We have found that, if prior to cooling, the material is placed over rods or the like as in the conventional festooning practice, a permanent set appears in the completed product. In order to prevent that, we prefer to provide a cooling chamber 45 so that the cooling operation may take place immediately and without requiring excessive space. At the same time, as indicated, this avoids the necessity of hanging the material in festoons as has been the prior practice. The cooling chamber 45 is provided with a conveyor 46 for advancing the carpet assembly therethrough, and is further provided with an inlet 47 and an outlet 48. We have found that satisfactory cooling is accomplished if ordinary outside air is circulated through the casing 45, and for this purpose we provide a blower 49.

By the time the carpet assembly 11 has reached the roller 50, it has been substantially cooled, and thereafter contact with the pile surface will not be injurious to the product. Accordingly, the assembly 11 is reversed around the roller 50 and is returned to the entrance side of the casing 45 and over a plurality of feed rollers 51.

In order to conserve space, preferably the heating chamber 32 and the cooling chamber 45 are located in elevated position. This is for the purpose of providing space therebetween for the apparatus which performs the final treating operation on the product. As indicated in Figure 1A, the fabric 11 passes along a frame 52 and over a roller 53. Steam nozzles 54 and 55 are provided for lightly steaming the pile surface of the fabric. Intermediate the steam nozzles 54 and 55 we provide a plurality of rotating brushes 56 for brushing the pile surface. At 57 we have indicated an oil treating device which will be described in detail later. At the present time it may be noted that the oil treatment comprises subjecting the pile surface of the fabric to an oil atmosphere. The pile fabric 11, after oil treatment, passes under a roller 58, over a roller 59, and under a roller 60 located on an inspection table 61. A suitable measuring device 62 is preferably provided for checking the output of the material, after which the material 11 passes to a widening device 63 at which time the material is wound into rolls 64 for shipment. Immediately in front of the inspection table 61 we provide a scray 65 having a smooth curved bottom 66 for receiving folds of the fabric if production continues during stoppages on the inspection table 61.

Referring now to Figures 2, 3 and 4, we have illustrated a suitable apparatus for treating the material with oil as previously outlined. In Figures 2 and 3 we have indicated a casing 57 which is open at its front, the open front in operation being closed by the material 11. Suitable guides 67, which may conveniently be Z-shaped in cross section, are provided, and these are preferably laterally adjustable over rolls 68 for the purpose of accommodating material 11 in different widths. In the chamber 57 is a horizontal header 69 provided with a plurality of atomizing nozzles 70 for the purpose of filling the interior of the casing 57 with a fine oil mist. Referring now particularly to Figure 4, the oil employed in this operation is contained in a tank 71 from which it is pumped under considerable pressure by a pump 72 to the header 69. A motor 73 is indicated in driving relation to the pump 72. A return conduit 74 is located in the bottom of the casing 57 and returns condensed oil to the tank 71 by gravity.

We have found that the product resulting from the practice of the herein described method presents important advantages over anything known to the prior art. The product is extremely economical to manufacture and the method which we have devised is a continuous method requiring little in the way of attention from operators. The step of applying the flock results in a firm adhesion of the flock pile, and we attribute this in large part to the presence of the unvulcanized blowing rubber stock both beneath and in the openings in the fabric. The cement as previously stated is preferably one containing rubber, and is therefore compatible with the rubber which forms the sponge rubber under layer. We have found that in the completed product there is a firm bond between the sponge rubber and the cement coating, independent of the fabric. This is indicated by the fact that when a portion of the pile is mechanically torn from place, it brings with it portions of the sponge rubber. It also appears that the application of the adhesive cement tends to soften the upper surface of the sponge rubber cement in a manner which both increases the effectiveness of the bond with the adhesive and with the flock, and also increases the firmness of the bond between the sponge rubber and the fabric.

Experiments have proved that in order to obtain the proper blowing and vulcanization of the rubber stock, together with suitable setting of the cement, it is highly desirable to apply heat to the product in the form of currents of heated air. We have found the best results follow the provision of separate two stage heating, as indicated. It is essential in the method disclosed herein that the rubber stock shall sponge or blow to its final thickness before substantial vulcanization takes place, and this may most effectively be controlled by the two stage heating disclosed herein. We have also found that important practical advantages follow the immediate cooling of the vulcanized material. The cooling of the material immediately after heating avoids the possibility of damage thereto while it is still in a hot condition, and furthermore, by cooling, as disclosed herein, that is by the provision of cooling currents of air we are unable to reduce the temperature of the product without requiring excessive space.

We have referred previously to the use of a blowing rubber stock or equivalent. While best results follow the use of high grade blowing rubber stock, very similar results may be obtained by substituting a synthetic rubber of types now on the market.

It is also possible to obtain a satisfactory product by employing a rubber stock not adapted to blow on vulcanization. Thus either new or reclaimed rubber can be employed, without blowing agents. In this case, however, we prefer to employ relatively large amounts of inexpensive, resilient filler. Ground cork, jute or other fibers may be employed and contribute to the production of a soft, yielding backing.

In these last cases, we prefer to employ our above described method in detail. The rubber, synthetic rubber, or rubber and filler mixture is calendered or otherwise initially secured to the fabric as set forth. This material as indicated above, improves the final product by forming a direct vulcanized bond with both the fabric and the upper coating of cement, as well as in some degree anchoring the pile in place.

We have further found that the final product is materially improved where it is subjected to the final treatments, namely, steaming, brushing and oil treating of the flock.

Reference was made above to the fact that the conveyor 36' which advances the carpet assembly through the heating chambers 34 and 35 is preferably porous. Since heating is by currents of hot air, the reason for this is obvious. We have found that flexible screens of suitable fine mesh are well adapted to this end. Too coarse a mesh results in undesirably large projections on the lower surface of the blown sponge. An intermediate mesh produces a pebbled lower surface which in some instances is desirable.

While we have in this application specifically described a single embodiment which our invention may assume in practice, it will be understood that the same is shown for the purpose of illustration and that the invention may be further modified and embodied in various other forms without departing from the spirit or scope of the appended claims.

What we claim as our invention is:

1. The method of making a floor covering which comprises first calendering an unvulcanized blowing rubber stock to the under side of an open woven fabric with sufficient pressure to force said stock into the openings in the fabric, then applying a coating of adhesive to the upper side of said fabric, then vibrating the assembly with said adhesive coating uppermost, while simultaneously distributing cut fibers onto said coating whereby to cause said fibers to form a surface of upstanding pile elements partly embedded in said adhesive coating, and thereafter heating said assembly to blow and vulcanize said blowing rubber stock.

2. The method of making a floor covering which comprises first calendering an unvulcanized blowing rubber stock to the under side of an open woven fabric so as to force said stock into the openings in the fabric, then applying a coating of adhesive to the upper side of said fabric, then advancing and vibrating the assembly with said adhesive coating uppermost while simultaneously distributing cut fibers onto said coating as said assembly advances, whereby to cause said fibers to form a surface of upstanding pile elements partly embedded in said adhesive coating, and thereafter heating said assembly to blow and vulcanize said blowing rubber stock.

3. The method of making a floor covering comprising the steps of first securing a relatively thick ply of unvulcanized blowing rubber stock to one side of a coarse open work fabric, then applying to the other side of said open work fabric a relatively thin substantially uniform coating of cement, then vibrating the assembly with the cement uppermost while simultaneously distributing cut fibers onto said cement so that such fibers will form a surface of upstanding pile elements partly imbedded in said cement, then heating the assembly to blow and vulcanize the blowing rubber stock and to dry the cement so that the latter will set to retain the pile elements therein, and immediately thereafter rapidly cooling the assembly to expedite the setting of the cement and of the vulcanized rubber to their ultimate final condition.

4. The continuous method of making a floor covering comprising the steps of first calendering a ply of unvulcanized blowing rubber stock to one side of a sheet of burlap, then applying to the other side of said burlap sheet a coating of cement containing rubber, then vibrating the assembly with the cement uppermost while simultaneously distributing cut fibers onto said cement so that such fibers will form a surface of upstanding pile elements partly imbedded in said cement, then applying in successive stages currents of heated air to the assembly to blow and vulcanize the blowing rubber stock and to dry the cement so that the latter will set to retain the pile elements therein, and immediately thereafter rapidly cooling the assembly to expedite the setting of the cement and of the vulcanized rubber to their ultimate final condition.

5. The continuous method of making a floor covering comprising the steps of securing a ply of unvulcanized blowing rubber stock to one side of a coarse open work fabric, applying to the other side of said open work fabric a coating of cement, vibrating the assembly with the cement uppermost while simultaneously distributing cut fibers onto said cement so that such fibers will form a surface of upstanding pile elements partly imbedded in said cement, applying currents of heated air to the assembly to blow and vulcanize the blowing rubber stock and to dry the cement so that the latter will set to retain the pile elements therein, and cooling the assembly to expedite the setting of the cement and of the vulcanized rubber to their ultimate final condition, the application of cement, vibration, heating, and cooling of the assembly as aforesaid being performed successively in the order named while such assembly is being continuously advanced in a given direction.

6. The method of making a floor covering comprising the steps of first securing a ply of unvulcanized blowing rubber stock to one side of a coarse open work fabric, then applying to the other side of said open work fabric a coating of cement, then vibrating the assembly with the cement uppermost while simultaneously distributing cut fibers onto said cement so that such fibers will form a surface of upstanding pile elements partly imbedded in said cement, and then applying currents of heated air to the assembly to blow and vulcanize the blowing rubber stock and to dry the cement so that the latter will set to retain the pile elements therein.

7. In the manufacture of flock carpet, the steps of first calendering blowing rubber stock onto the back of a fabric strip, then applying adhesive to the face of said strip, then applying flock to the adhesive while vibrating the assembly, and then advancing the assembly horizontally through one or more heating chambers and a cooling chamber seriatim, whereby the adhesive is set, and the rubber is blown, vulcanized and cooled in a minimum of space.

8. In the manufacture of flock carpet, the steps of first calendering blowing rubber stock onto the back of a fabric strip, then applying adhesive to the face of said fabric strip, then applying flock to the adhesive while vibrating the assembly, then advancing the assembly horizontally through a first heating chamber, a second heating chamber and a cooling chamber seriatim, whereby the adhesive is set, and the rubber is blown, vulcanized and cooled in a minimum of space, then reversing the direction of said assembly after passage substantially through said cooling chamber, and then returning said assembly through said cooling chamber.

9. The method of making a floor covering which comprises first securing in surface to surface relation to one side of a fabric sheet a layer of unvulcanized blowing rubber stock, then applying to the other side of said sheet a layer of cement, then vibrating the assembly with the cement uppermost while simultaneously distributing cut fibers onto said cement so that such fibers will imbed themselves endwise in said cement and thereby form a surface of pile elements partly imbedded in said cement, then heating the assembly to blow and vulcanize the blowing rubber stock and to dry the cement so that the latter will set to retain the pile elements therein, and then cooling the assembly to expedite the setting of the cement and of the vulcanized rubber.

10. The method of making a floor covering which comprises first securing an unvulcanized blowing rubber stock to the underside of an open woven fabric, then applying a coating of adhesive to the upper side of said fabric, then advancing and vibrating the assembly with said adhesive coating uppermost while simultaneously distributing cut fibers onto said coating so as to cause said fibers to imbed themselves endwise in said adhesive and thereby form a surface of upstanding pile elements partly imbedded in said adhesive, and thereafter heating said assembly to blow and vulcanize said blowing rubber stock.

HAROLD P. FARIS.
DANIEL W. YOCHUM.
RUSSELL B. LOGAN.